United States Patent Office 3,578,719
Patented May 11, 1971

3,578,719
SURFACE ACTIVE AGENTS
Gregoire Kalopissis, Paris, and Guy Vanlerberghe, Montjay-la-Tour, France, assignors to Societe Anonyme dite: L'Oreal, Paris, France
No Drawing. Continuation-in-part of application Ser. No. 544,095, Apr. 21, 1966. This application Nov. 29, 1968, Ser. No. 780,300
Claims priority, application Luxembourg, Apr. 23, 1965, 48,458; Nov. 22, 1965, 49,902; Apr. 6, 1966, 50,850; France, Dec. 1, 1967, 130,713
Int. Cl. C07c *41/00, 43/04*
U.S. Cl. 260—611                                              9 Claims

ABSTRACT OF THE DISCLOSURE

Non-ionic surface active agents having the formula

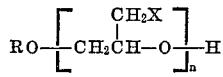

in which R is a lipophile group, X is OH or halogen and $n$ is 2–10.

SUMMARY OF THE INVENTION

This application is a continuation-in-part of application Ser. No. 544,095, filed Apr. 21, 1966 and now abandoned.

There are quite a number of known nonionic surface active agents the composition and properties of which are quite varied.

Nevertheless the known products made from the conventional raw materials do not have simultaneously all the characteristics which are desired for certain purposes.

For instance the best detergents and foaming agents among those monoethers of polyethylene glycol which comprise a lipophile chain having at least 8 carbon atoms are generally the most irritating to the mucous membranes. Moreover, when mixed with cationic surface active agents the degree of irritation increases synergistically.

On the other hand, the derivatives of the polyols and the sugars, especially their esters, have been considered most useful because they are not irritating. They have, however, certain disadvantages which result from their composition. In particular, the nonselective character of the reactions used in their preparation results in the formation of a mixture of constituents having one or more lipophile chains per molecule. When these products are to be used for applications for which solubility in water is a prerequisite, they must therefore be painstakingly purified.

The hydrosolubility of these compounds may be improved by adding hydrophile substituents on the carbon chain or by adding ethylene oxide to the free hydroxyl groups. However, such compounds are not usually very good foaming agents, even when they comprise a medium length hydrocarbon chain. They are consequently used mainly as emulsifiers.

The object of the invention is to produce, from conventional commercial raw materials, new nonionic surface-active agents which are stable, very hydrophile, non-irritating, nontoxic and which may be used as emulsifiers, foaming agents, detergents, or wetting agents.

Another object of the present invention is to provide a method of preparing preferred new nonionic surface-active compounds having the formula:

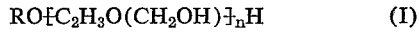

in which R represents a lipophile group that is a linear or branched alkyl or alkenyl, which have 8 to 20 carbon atoms or an alkyl aryl group which has a linear or branched alkyl chain and which has 8–22 carbon atoms, and in which $n$ is 2 to 10, essentially characterized by the fact that $n$ molecules of glycerol epihalohydrin are polyadded to a hydroxylated compound having the formula ROH, in which R has the significance indicated above, and that the resulting product is hydroxylated with a carboxylic acid salt.

A further object of the present invention is to provide the new article of manufacture which consists of nonionic surface-active agents according to Formula I made by the foregoing process.

Another object of the present invention is to provide as new articles of manufacture, the intermediate products obtained while carrying out the above-mentioned process, after the polyaddition has taken place but before the hydroxylation, said intermediates having the formula:

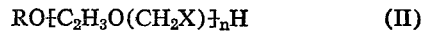

in which R has the significance indicated above, $n$ is a number greater than 2 and less than 11 and X represents a halogen.

Broadly the present application covers the class of nonionic surface-active agents described above and those which may be prepared from natural or synthetic aliphatic or alicyclic alcohols having a high molecule weight. The term "natural alcohols" is intended to include those derived, for example, from lanolin, natural waxes (e.g., beeswax), hydroabietic alcohols derived from resinous acids, and alcohols obtained by reducing cyclic fatty acids.

It is known that lanolin alochols, for example, comprise up to 30 carbon atoms, and that they consist of a mixture of straight or branched chain derivatives which are members of the aliphatic series and alicyclic alcohols (sterols and triterpenic alcohols). The alcohols found in lanolin are recovered by saponification and extraction, essentially in the form of esters of fatty acids. Hydrogenation yields a mixture comprising both the alcohols of the unsaponifiable material and those derived from the fatty acids of the lanolin.

High molecular weight alcohols may be obtained in like manner from natural waxes (beeswax, for example) and from resinous acids.

The nonionic surface-active agents envisaged by the present application may be used in cosmetic compositions, and particularly in shampoos and in emulsions. They are very stable chemically and completely harmless when applied to the skin and mucous membrane.

It is an object of the present application to provide new nonionic surface-active agents responding to the general formula:

in which $n$ has a statistical average value of from 1 to 10, and $R_1$ represents a hydrocarbon radical derived from aliphatic or alicyclic alcohols, of either natural or synthetic origin, such as linear or branched alkyl, alkenyl, alkyl aryl, alkyl alicyclic and alkenyl alicyclic groups, which may comprise up to 30 carbon atoms and a process of making these compounds. This process is essentially characterized by the fact that $n$ molecules of glycerol epihalohydrin are polycondensed on an alcohol having the formula $R_1OH$, in which $R_1$ has the significance hereinbefore indicated, the resulting product is then hydroxylated by means of carboxylic acid salt, and the ester thus formed is hydrolyzed or alcoholyzed.

It is a further object of the present invention to provide, as new compositions of matter, the nonionic surface active agents responding to Formula I and III produced by the above process.

It is a still further object of the present invention to provide, as new compositions of matter, the intermediates which are obtained in the course of the above process, after completion of the polycondensation step and before hydroxylation, which intermediates respond to the general formula:

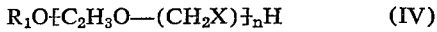
(IV)

in which $R_1$ has the significance hereinbefore indicated, $n$ has a statistical average value between 2 and 10, and X represents a halogen.

It is clear that in the course of the polycondensation which constitutes the first step of the process according to the invention a mixture of compounds responding to general Formula IV is formed, but in these compounds the number of glycerol epihalohydrin molecules attached may be greater or less than the statistical average value of the number of molecules of glycerol epihalohydrin supplied per molecule of alcohol. Consequently, the process according to the invention makes it possible to obtain a mixture of compounds having hydrophile chains the size of which is dependent on the value of the number $n$ in Formula IV, the group of values of $n$ being statistically distributed about an average value corresponding to the number of molecules of glycerol epihalohydrin provided per molecule of alcohol.

But the important point, which represents one of the essential advantages of the process according to the invention, is that it leads to the formation of compounds having a single lipophile group for each hydrophile chain.

Moreover, it should be pointed out that the process according to the invention makes it possible to regulate the lipophile property of the resulting product by varying the value of the number $n$ of glycerol epihalohydrin molecules provided for each molecule of alcohol.

When $n$ is at least equal to ⅓ of the number of carbon atoms in the lipophile chain, the products are detergents which are soluble in water. Moreover, the derivatives in which the lipophile chain contains 10–14 carbon atoms make good foaming agents, while those in which the lipophile chain contains more than 14 carbon atoms are emulsifiers.

When $n$ is more than 10 the condensation becomes difficult because beyond this value, we obtain the phenomenon described in the JACS, vol. 82, January 1960, No. 1 (pp. 120 to 124), Latremouille, Merrall and Eastham, that is to say the depolymerization of our products by formation of dioxane and rupture of chain links.

In a preferred embodiment of the invention the glycerol epihalohydrin is polycondensed in the presence of a Lewis acid catalyst such as boron trifluoride, stannic chloride, or antimony pentachloride, at a temperature between 25° and 160° C.

When boron trifluoride is used, this is introduced in the proportion of 1 to 2% of the total reaction mass and the reaction is preferably carried out at between 60° and 120° C.

The hydroxylation which constitutes the second step of the process makes it possible to avoid the disadvantages inherent in those reactions in which hydroxyl groups are directly substituted for halogens. It is well known that the preparation of hydroxylated compounds by hydrolysis of halogen derivatives is, in general, quite difficult, that the substitution is often incomplete, and that the presence of the mineral halides has an adverse effect on the solubility and makes it laborious to separate the desired end product. The hydroxylation step which it is preferred to use in the practice of the present invention consists in reacting the halogen derivative of Formula IV with an alkaline salt of carboxylic acid, preferably within a solvent which insures both the miscibility of the reagents and the easy separation of the halide formed. In this method, the selected solvents participate by progressive alcoholization of the esters formed in an intermediate stage. Among the solvents having the required properties are propylene glycol, dipropylene glycol, diethylene glycol, ethylene glycol, hexylene glycol and 2-butoxyethanol, the boiling points of which are sufficiently high to make it unnecessary to use an autoclave. In general, it has been found that the amount of solvent to be used should equal at least 50% by weight of the amount of polyhalogenated ether which is to be hydroxylated, and preferably from 100 to 400% by weight.

The hydroxylation reaction is carried out at a temperature high enough for the speed of the reaction to be convenient and low enough so that there is no degradation of the products formed. A temperature between 150 and 200° C., and preferably between 180 and 190° C. is suitable. The percentage of hydroxylation resulting under these conditions is always greater than 90%.

The alkaline salt of carboxylic acid used in the hydroxylation step is advantageously an acetate in stoichiometric proportions or in slight excess (10 to 15% at the maximum), with respect to the halogenated compounds participating in the reaction. It has been found that the results remain equally satisfactory when the acetates are added all at once at the beginning of the hydroxylation step, or in successive fractions in the course of this reaction. It is possible to regenerate the acetates in situ from the esters formed during the reaction, for example, by adding an aqueous solution of an alkaline hydroxide and instantaneously evaporating the water.

Finally, in order to avoid coloring the products obtained during the hydroxylation, it has been found that it suffices to add reducing agents such as sodium hypophosphite or alkaline borohydrides.

The products according to Formula III are very valuable because of their emulsifying properties and their compatability with ionic surface-active agents. This compatability makes it possible to introduce them into aqueous or hydroalcoholic solutions in association with ionic surface-active agents.

It is a further object of the present invention to provide cosmetic compositions, and particularly shampoos, hair dyes, or emulsions such as cleansing creams, hydrating creams, and nourishing creams, which are essentially characterized by the fact that they contain at least one product responding to Formula III.

It is a final object of the present invention to provide new examples of nonionic surface-active agents such as those described in the earlier application, as well as compositions containing same.

The surface-active agents envisaged by the present application are also particularly effective peptizing agents for dispersing solid pulverulent materials in nonaqueous liquid media, and particularly in oils.

The present application also provides dispersions of solid pulverulent products in nonaqueous liquid media, and particularly in oils, these dispersions being characterized by the fact that they contain as a peptizing agent at least one product according to Formula III.

Pigments ground up in oil are used in the cosmetic field. These pigments are often obtained by precipitation, and are dried. After drying they reagglomerate, so that they must be ground before being mixed with the oil. This grinding is not too fine because it is limited by the mechanical means available. It has been suggested that the precipitated product be dried in the presence of oil. However, experience has shown that, even though insoluble in water, a large part of the pigment is not emulsified by the oil and reagglomerates on drying. It has been found that drying of the pigments in the presence of a peptizer according to the invention formed by a compound according to the Formula III redisperses the pigments in the oil while retaining their original degree of fineness.

Moreover, it should be emphasized that the compounds of Formula I in a 5% aqueous solution are completely harmless and freely tolerated by the mucous membrane of the eye. This property has been clearly established by tests carried out on the eyes of a group of rabbits using the methods described by J. H. Draize, G. Woodard and H. O. Calvery in the "Journal of Pharmacology," 1944, vol. 82, pages 377–389 and by J. H. Draize and E. A. Kelly in "Proceedings of Scientific Section," 17, 1–4 (1952). No lesions of any nature appeared in the mucous membranes of the eyes of rabbits after such tests. Moreover, these compounds, when associated with cationic surface-active agents, cause no synergistic irritation. On the contrary, they decrease the irritation caused by certain quaternary ammonium halides.

The cosmetic compositions according to the invention are preferably aqueous solutions comprising about 1–25% of the compounds of Formulas I and III. When conventional additives such as thickening agents or other ionic or nonionic surface-active agents may be added to these compositions and the air is washed with such solutions it becomes shiny, soft and nonelectric.

It has, moreover, been found that the compounds according to Formula may be used in cosmetic compositions as carriers for hair dyes.

In order that the invention may be clearly illustrated examples which show the general method of preparation and use of compounds of this invention will now be described.

EXAMPLE 1

Preparation of the compound $C_{12}H_{25}O[C_2H_3O(CH_2OH)]_nH$ in which $n$ has a statistical average value of about 4.

First step—polycondensation 186 g. of lauric alcohol and 1.5 ml. of an acetic compound of boron fluoride containing 36% $BF_3$ is introduced into a flask adapted to hold a liter and provided with stirring means, a thermometer and a cooling coil.

The mixture is heated to 75° C. and 389 g. of glycerol epichlorohydrin is added drop by drop. The reaction is exothermic, and the temperature stays between 75° and 80° C. The operation lasts 75 minutes, after which the reaction mixture is permitted to return to room temperature.

The resulting polyoxychloropropylenated lauric alcohol is a clear yellow oil which is insoluble in water. The epoxide function is measured to verify that the epichlorohydride has completely reacted.

Second step—hydroxylation 144 g. of potassium acetate is dissolved in 360 g. of dipropylene glycol. This solution is heated to 180° C. under a nitrogen atmosphere.

181 g. of the product obtained in the first step is added while stirring. This takes 30 minutes. The mixture is then heated for 2½ hours at between 180 and 190° C. After cooling it to room temperature the potassium chloride formed is separated by filtration, with a yield of about 96% of the quantity which should theoretically have been formed.

The partially acetylated dipropylene glycol is evaporated under vacuum from the filtrate and a sirupy product soluble in water is thus isolated.

The index of saponification determined for both the end product and the recovered solvent, shows that the polyhydroxylated polyether is 85% deacetylated.

The product is then dissolved in 500 ml. of absolute alcohol. This solution is colored with vegetable black and 300 mg. of sodium ethylate dissolved in 10 ml. of absolute alcohol is added. The resulting mixture is left at room temperature for 6 hours, which permits deacetylation of the product. After evaporation of the ethyl acetate and the alcohol, 147 g. of an end product having the following characteristics is recovered:

Saponification index—0
Hydroxyl index—546
Iodine index—1
Percentage of potassium acetate—7%

This compound is in the form of a sirupy liquid which is readily soluble in water. It has excellent foaming characteristics and is perfectly tolerated by the mucous membranes of the eye.

EXAMPLE 2

Preparation of the compound having the formula $C_{12}H_{25}O[C_2H_3O(CH_2OH)]_nH$ in which $n$ has a statistical average value of about 4.

In a first step the glycerol epichlorohydrin is polycondensed on the lauric alcohol in the manner described in Example 1.

In the second step, hydroxylation is effected in the following manner:

0.84 mol of crystallized sodium acetate in the form of the trihydrate and 0.11 g. of sodium hypophosphite are dissolved in 115 g. of diethylene glycol. The solution is heated under a nitrogen atmosphere. When the temperature reaches 120° C. the water begins to distill away. At 140–145° C. gelification may be seen.

115 g. of polyoxychloropropylene lauric alcohol are then added within 20 minutes, while stirring and maintaining the temperature between 140 and 145° C. The reaction mixture again becomes fluid, and is heated at 180° C. to complete the evaporation of the water.

The reaction is then continued at 180–185° C. for three hours. Under these conditions from 95.5 to 96% of the sodium acetate involved is consumed. After cooling to 80° C., the solution is filtered and the sodium chloride washed with 29 g. of diethylene glycol at 80° C.

The diethylene glycol is evaporated from the filtrate under vacuum and while heating to 180° C. 107 g. of a product having a saponification index of 64 and 150 g. of partially acetylated diethylene glycol having a saponification index of 244 are recovered.

The deacetylation of the polyhydroxypolyether is terminated by saponification with aqueous 13% sodium hydroxide at a temperature of 40–45° C. This step takes an hour and a half.

EXAMPLE 3

Preparation of the compound $RO[C_2H_3O(CH_2OH)]_nH$ (in which R represents a linear aliphatic chain having 12 to 14 carbon atoms derived from copra and $n$ has a statistical average value of 4.)

First step—polycondensation

Proceeding as in Example 1, 370 g. of glycerol epichlorohydrin is reacted with 200 g. of a mixture of fatty alcohols of copra consisting essentially of dodecanol and tetradecanol in the proportion of about 70% of the first to 30% of the second. This produces a polychlorinated polyether.

Second step—hydroxylation 114 g. of the compound thus obtained is dissolved in 200 g. of dipropylene glycol. The solution is heated to 180° C. and 80 g. of potassium acetate is added little by little. After 4 hours and 30 minutes of reaction at 180° C., 96 to 97% of the acetate introduced has been consumed. The potassium chloride thus formed is separated, the solvent is evaporated, and as indicated in Example 1, the product is dissolved in ethyl alcohol. The ethyl acetate and alcohol are then eliminated and 100.5 g. of a sirupy product is recovered. This product is soluble in water and responds to the formula given at the beginning of this example.

EXAMPLE 4

Preparation of the compound having the formula $RO[C_2H_3O(CH_2OH)]_nH$ (in which R represents a linear aliphatic chain having 12 to 14 carbon atoms, and $n$ has a statistical average value of about 5.5.)

First step—polycondensation

In the same way described in Example 1, 509 g. of glycerol epichlorohydrin is reacted with 194 g. of a mixture of fatty alcohols containing about 70% of dodecanol and 30% of tetradecanol in the presence of 1.5 ml. of an acetic compound of boron fluoride comprising 36% $BF_3$.

This yields a chlorinated polyether.

Second step—hydroxylation 70 g. of polychlorinated polyether obtained in the first step hereinbefore described is dissolved in 735 g. of 2-butoxy ethanol. The solution is heated to 170° C., and 55 g. of anhydrous potassium acetate is then introduced little by little, over a period of 40 minutes.

After reacting for 7 hours at 170° C., the reaction mixture is permitted to return to the ambient temperature. 94% of the quantity of potassium chloride which should theoretically have been formed is separated by filtration. After evaporation of the solvent 67.5 g. of a product is recovered, which is then deacetylated with ethanol, in the presence of potassium hydroxide which acts as a catalyst. The alcohol and ethyl acetate are then eliminated.

The resulting polyhydroxyl ether is soluble in water and is a good foaming detergent.

EXAMPLE 5

Preparation of the compound

RO$\{C_2H_3O(CH_2OH)\}_nH$ (in which R is an alkyl radical having 6 to 18 carbon atoms and $n$ has a statistical average value of 6.)

First step—polycondensation

The method of operation in essentially that of Example 1. 416 g. of glycerol epichlorohydrin is reacted at between 70 and 80° C. with 188 g. of a mixture of cetyl alcohol and stearylic alcohol in the presence of 0.87‰ of boron fluoride, yielding a polychlorinated polyether.

Second step—hydroxylation 156 g. of the compound thus obtained is mixed with 144.5 g. of potassium acetate dissolved in hexylene glycol at a temperature between 180° and 195° C. The temperature is maintained for three hours. Then it is cooled to 25° C. and the potassium chloride formed is separated by filtration. The hexylene glycol is then evaporated under a pressure of 15–20 mm. of mercury while progressively increasing the temperature to 180° C. The product is deacetylated by ethanolysis with sodium ethylate as the catalyst. The ethyl acetate and the alcohol are eliminated, and 132 g. of a pasty product which dissolves in water at 75° C. is recovered.

EXAMPLE 6

Preparation of the compound $C_{18}H_{37}O\{C_2H_3O(CH_2OH)\}_nH$ in which $n$ has a statistical average value of 10.

First step—polycondensation

In the same general way as in Example 1, 462.5 g. of glycerol epichlorohydrin in reacted with 143.5 g. of stearyl alcohol in the presence of 1.1‰ of boron fluoride. The reaction mixture is kept for four hours between 60 and 65° C. and then heated to 120° C. for five minutes. It is then stirred while being permitted to return to the ambient temperature.

The result is a polychlorinated polyether.

Second step—hydroxylation 242.5 g. of the compound obtained in the first step is heated with 200 g. of potassium acetate, using 300 g. of dipropylene glycol as the solvent. The reaction is continued for three hours at between 185 and 190° C. The chloride ion and the potassium acetate are then measured to determine the percentage of transformation, which is found to be between 97 and 98%. The resulting product is isolated and ethanolyzed as in Example 1. After the alcohol and ethyl acetate have been evaporated, the process yields 177 g. of a solid product which, in aqueous solution, is slightly opalescent at 25° C. and limpid at 60° C.

EXAMPLE 7

Preparation of the compound

RO$\{C_2H_3O(CH_2OH)\}_nH$ (in which $n$ has statistical average value of 5 and R is branched chain alkyl radicals containing 11 to 16 carbon atoms derived from an alcohol obtained by "Oxo" synthesis).

First step—polycondensation

Using the method of Example 1, 231.2 g. of glycerol epichlorohydrin are reacted with 105.5 g. of a mixture of fatty alcohols obtained by "Oxo" synthesis, the branched hydrocarbon chain which contains 11 to 16 carbon atoms. This reaction is carried out in the presence of 0.75 ml. of an acetic compound of boron fluoride.

This yields a polyoxychloropropylenated alcohol which is insoluble in water and a deep brown in color.

Second step—hydroxylation 134.7 g. of the compound thus obtained is dissolved in 876 g. of dipropylene glycol, and 1 g. of potassium borohydride is added to this solution. The mixture is heated while stirring and loses color rapidly. 100 g. of potassium acetate is then added, followed by 50 g. of dipropylene glycol. After 3 hours of reaction at 175–180° C., 93.5% of the potassium acetate supplied has been consumed.

The potassium chloride is separated by filtration, after which the solvent is evaporated by progressively raising the temperature to 180° C. under a reduced pressure (15 to 20 mm. of mercury). The resulting product is then subjected to ethanolysis in the presence of alcoholic potassium hydroxide.

The ethyl acetate and alcohol are then eliminated and 135.5 g. of a sirupy liquid is recovered. This liquid dissolves easily in water and may be used as a foaming detergent.

EXAMPLE 8

First step—polycondensation

Glycerol epichlorohydrin is reacted with commercial oleic alcohol having a hydroxyl index of 207 and an iodine index of 88.

This yields polychlorinated mono-alkyl-ethers responding to the formula

RO$\{C_2H_3O(CH_2Cl)\}_nH$ in which R designates the radical derived from the oleic alcohol raw material and $n$ has the value 2, 4, 5 or 6.

This reaction is carried out at about 60° C., using as catalyst an acetic compound of boron fluoride in the ratio of about 0.25 ml. per 100 g. of reaction mass.

Second step—hydroxylation

The polychlorinated ether obtained in the first step of the present example is treated with a stoichiometric quantity of potassium acetate at a temperature of about 180–185° C., for 5 hours. The solvent used in this reaction is dipropylene glycol. The quantity of solvent is equal in weight to that of the chlorinated ether and the potassium acetate combined.

The products obtained at the end of the hydroxylation step have properties which are summarized in the following table:

| Value of n: | Appearance | Solubility |
|---|---|---|
| 2 | Yellow oil | Dispersible in water. |
| 4 | Yellowish paste | Soluble in water with turbidity. |
| 5 | Clear brown paste | Soluble in a hydroalcoholic medium containing 10% alcohol. |
| 6 | do | Soluble in water. |

EXAMPLE 9

First step—polycondensation 343 g. of "Hexadecylic" alcohol, sold commercially by Esso, is reacted with 180 g. of glycerol epichlorohydrin in the presence of 1.25 ml. of an acetic compound of boron fluoride, yielding a polychlorinated ether having the formula

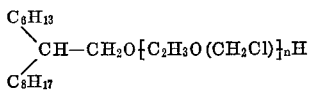

in which $n$ has a statistical average value of 1.5.

Second step—hydroxylation

This polychlorinated ether is treated with a quantity of potassium acetate 5% in excess of the stoichiometric quantity. After reacting for 5 hours at 180° C., the resulting salt is filtered and the dipropyleneglycol which was used as solvent is evaporated off.

The crude product is then saponified with aqueous sodium hydroxide at 48% by weight, washed in boiling water to eliminate the electrolytes, and dried, to yield the hexadecylic monoether having the formula:

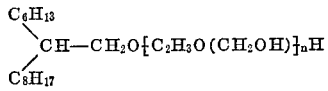

in which $n$ has a statistical average value of 1.5 and is an almost colorless oil which is dispersible in water. The product may advantageously replace the oleic derivative having the same hydrophilic chain. Because it contains no double bond it does not turn rancid.

EXAMPLE 10

First step—polycondensation 372 g. of lauric alcohol (i.e., the product sold under the trademark "Alfol–12") is reacted at 85–90° C. with 278.5 g. of glycerol epichlorohydrin in the presence of 1.65 ml. of an acetic compound of boron fluoride.

The result is a lauryl ether having the formula:

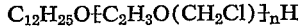

in which $n$ has a statistical average value of 1.5.

Second step—hydroxylation 162 g. of polychlorinated ether prepared in the first step is treated with 74 g .of potassium acetate in 220 g. of 2-butoxy ethanol at 170° C. for 3½ hours. The raw product obtained is then saponified with 95 g. of 30% sodium hydroxide at a temperature of 50–60° C. 250 ml. of water is then added to the reaction mixture. The aqueous phase containing the electrolytes is then separated by decanting. The organic phase is twice washed with an aqueous solution of 15% sodium sulfate, which has first been heated to 70° C.

Third step—preparation of a sulfated derivative 74 g. of polyhydroxylated ether prepared in the first step is mixed with 6 g. of urea and heated to 90° C. 25 g. of sulfamic acid is then added. The mixture is vigorously mixed using a turbo-mixer and heated on an oil bath to 120° C. The reaction is then strongly exothermic and, while heating is discontinued, the temperature rises to 140° C.

The resulting sulfate dissolves readily in water and is a good foaming detergent.

EXAMPLE 11

Preparation of the compound

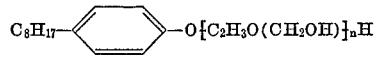

in which $n$ has a statistical average value of about 6.

First step—polycondensation 2.5 ml. of phenolic boron fluoride compound containing 26% $BF_3$ is added to 167 grams of melted octylphenol.

416 grams of glycerol epichlorohydrin is then added, drop by drop, while stirring. The reaction begins at 95° C., after which the temperature is lowered to 75°–80° C. when the mixture will remain liquid at the latter temperature.

The epichlorohydrin is added over a period of 60 minutes, 0.5 ml. of the phenolic boron fluoride compound is then added and the reaction terminated while continuing to stir the mixture.

No loss of weight due to evaporation of volatile products occurs while the mixture is being heated in a waterbath under a vacuum produced by a water-jet pump. The polychlorinated ether thus obtained is in the form of a viscous oil.

Second step—hydroxylation 300 g. of potassium acetate is dissolved in 700 g. of dipropyleneglycol and the resulting solution heated to 180° C. under a nitrogen atmosphere.

398 g. of the product obtained in the first step is then added while stirring the mixture for 170 minutes, after which it is heated for 100 minutes at between 180° C. and 190° C. It is then cooled to room temperature and the potassium chloride formed therein is filtered out.

The partially acetylated dipropylene glycol is evaporated under vacuum from the filtrate.

The product thus obtained is dissolved in 750 ml. of absolute alcohol; the solution is colored with vegetable black, and 30 ml. of alcoholic potassium hydroxide at half normal strength is added. The resulting mixture is left at room temperature for 4 hours and 30 minutes, thus deacetylizing the product. After evaporation of the ethyl acetate and the alcohol 335 g. of a product responding to the formula at the beginning of this example is obtained in the form of a viscous substance which is soluble in water. This substance has good foaming power and does not irritate the mucous membrane of the eye.

EXAMPLE 12

Preparation of the compound

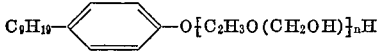

in which $n$ has a statistical average value of 6.

First step—polycondensation

Following the method described in Example 1, 416 g. of glycerol epichlorohydrin is reacted with 172 g. of commercial nonyl-phenol. A polychlorinated polyether is thus obtained.

Second step—hydroxylation 300 g. of potassium acetate is dissolved in 700 g. of dipropylene glycol. The solution is heated to 180° C. and 392 g. of the product obtained in the first step is added, little by little. After reacting for 4 hours at 180° C., about 95% of the theoretical quantity of potassium chloride has been formed and should then be separated out. The solvent is then evaporated and the ethyl acetate and alcohol eliminated, to yield 345 g. of a viscous product which is soluble in water and responds to the formula given at the beginning of this example.

EXAMPLE 13

Preparation of the product represented by the formula $$RO \mskip-2mu\left[C_2H_3O(CH_2OH)\right]_n\mskip-2mu H$$

in which R is a hydrocarbon derived from lanolin alcohol obtained by catalytic hydrogenation of lanolin and sold under the trademark "Elrolan" by the Veb Deutsches Hydrierwerk, and $n$ has a statistical average value of 4

First step—polycondensation 0.7 ml. of an acetic complex of boron fluoride is added to 103 g. (25% of the molecularly equivalent amount of alcohol) in the form of the above "Elrolan" which has been melted.

The mixture is heated to 75°–80° C., and 92.5 g. of glycerol epichlorohydrin is introduced, while stirring. This addition is so regulated as to keep the temperature substantially constant, as a result of the exothermic character of the reaction.

This operation takes 40 minutes. The reaction mixture is then heated in a water bath for 15 minutes.

The result is a polychlorinated ether in the form of a viscous oil.

Second step—hydroxylation 156.6 g. of polychlorinated ether is dissolved in 160 g. of dipropyleneglycol. The mixture is heated to 145° C. 260 g. of a 30% aqueous solution of potassium acetate is then introduced. In the course of this operation the temperature is progressively increased so as to eliminate water from the reaction mixture. This is then maintained at 180°–185° C. under a nitrogen atmosphere for three hours.

After cooling, the potassium chloride is separated by filtration. The precipitated salt is washed with hot dipropylene glycol. The solvent is evaporated from the filtrate at first under a reduced pressure of 15–20 mm. of mercury, and then under a pressure of 1 mm.

The product is then introduced into 225 ml. of absolute alcohol and subjected to ethanolysis. For this purpose sodium methylate is used as a catalyst in the proportion of 0.275 g. per 100 g. of product to be treated.

The mixture is kept first at 35° C. so as to obtain a homogenous mixture, and then left at room temperature overnight. After evaporation of the ethyl acetate and alcohol, a yellow-brown paste is recovered which can be dispersed in water. The composition of this paste is represented by the formula given at the beginning of the example, and it has the following characteristics: hydroxyl index: 372; saponification index: 9.

EXAMPLE 14

Preparation of the product represented by the formula $$RO\mskip-2mu\left[C_2H_3O(CH_2OH)\right]_n\mskip-2mu H$$

in which $n$ has a statistical average value of 7.6 and R represents the alkyl radical of the mixture of hydrogenated lanolin alcohols sold commercially under the trademark "Elrolan."

First step—polycondensation of epichlorohydrin

In this process 41.3 g. of the mixture of lanolin alcohols, 74 g. of glycerol epichlorohydrin and 0.4 ml. of an acetic complex of boron fluoride, which is introduced into the reaction mixture in three fractions: 0.2 ml. at the beginning of the reaction; 0.1 ml. before the end of the addition of the first half of the epichlorohydrin used; and 0.1 ml. while the second half of the epichlorohydrin is being introduced.

The temperature is kept at 80°–85° C.

Under these conditions 93% of the epoxide introduced is consumed, i.e., 7.6 mols per molar equivalent of alcohol.

After evaporation of glycerol epichlorohydrin the result is a polychlorinated ether represented by the formula:

$$RO\mskip-2mu\left[C_2H_3O(CH_2Cl)\right]_n\mskip-2mu H$$

in which R and $n$ have the significance hereinbefore assigned thereto.

Second step—hydroxylation

This step is carried out at 180°–185° C. in a propylene glycol bath, utilizing potassium acetate in stoichiometric proportions with respect to the chlorin.

After 4 hours of heating at 180°–185° C., the percentage of substitution is of the order of 96%.

After separating the potassium chloride by filtration, the dipropylene glycol is evaporated under subatmosphere pressure.

As in Example 1, the deacetylation is terminated by ethanolysis.

The resulting product is dissolved in water. The solution thus produced exhibits a turbidity which does not increase when the temperature is raised to 100° C.

EXAMPLE 15

Preparation of the product represented by the formula $$RO\mskip-2mu\left[C_2H_3O(CH_2OH)\right]_2\mskip-2mu H$$

in which R represents the alkyl radical of the hydrogenated lanolin alcohols sold commercially under the trademark "Hydrolan" by Occo International (Division of Millmaster Onyx Corporation). This raw material has a hydroxyl index of 154.

The polycondensation of epichlorohydrin and the hydroxylation reaction are carried out under conditions identical to those described in Example 13. The product thus obtained is in the form of a soft water insoluble wax.

EXAMPLE 16

Preparation of the product represented by the formula $$RO\mskip-2mu\left[C_2H_3O(CH_2OH)\right]_3\mskip-2mu H$$

in which R represents the alkyl of the lanolin alcohols sold under the trademark "Hydrolan."

The polycondensation of the epichlorohydrin is carried out at 80°–90° C. in the presence of boron fluoride as a catalyst and in the proportion of 0.15% of the total weight of the reaction mixture. Hydroxylation is brought about by heating at 180° C. for 4 hours and a half.

The polyhydroxyl polyether represented by the above formula takes the form of a yellow-brown paste.

It is dispersible in water.

EXAMPLE 17

An aqueous solution having the following composition is prepared:

|  | G. |
|---|---|
| $C_{12}H_{25}O\mskip-2mu\left[C_2H_3O(CH_2OH)\right]_n\mskip-2mu H$ ($n$ having a statistical average value of 4) | 10 |
| Cetyl-trimethyl-ammonium bromide | 3 |
| Water, q.s.p. | 100 |
| Lactic acid, q.s.p., pH 5. | |

10 cm.³ of this composition is applied to hair which has first been dampened and the hair is then energetically massaged to emulsify all the dirt. It is then rinsed copiously with water and 8 to 10 cm.³ more of the product is applied. An abundant foam is obtained and rinsed away, leaving the hair shiny, soft and nonelectric.

EXAMPLE 18

An aqueous solution having the following composition is prepared:

|  | G. |
|---|---|
| $C_{12}H_{25}O\mskip-2mu\left[C_2H_3O(CH_2OH)\right]_n\mskip-2mu H$ ($n$ having a statistical average value of 4) | 15 |
| Diethanolamide of copra | 1 |
| Polyethylene glycol (molecular weight: 5,000,000) | 0.1 |
| Water, q.s.p. | 100 |

The pH of the solution is 7.5.

10 cm.³ of this composition is applied to hair which has first been dampened and the hair is then massaged energetically to emulsify all the dirt, and rinsed copiously with water. 8 to 10 cm.³ more of the product is then applied, producing an abundant foam, and the hair is again rinsed, leaving it shiny, soft, and nonelectric.

EXAMPLE 19

An aqueous solution having the following composition is prepared:

|  | G. |
|---|---|
| RO$\{C_2H_3O(CH_2OH)\}_nH$ (in which R is an alkyl radical having 12 to 14 carbon atoms and $n$ has a statistical average value of 4) | 5 |
| Sodium salt of ethoxy alkyl sulfate | 7 |
| Diethanolamide of copra | 2 |
| Water, q.s.p. | 100 |

The pH of the solution is 7.5.

10 cm.³ of this composition is applied to hair which has first been dampened and the head is massaged energetically to emulsify all the dirt, after which it is rinsed copiously with water. 8 to 10 cm.³ more of the product is then applied, yielding an abundant foam. The hair is again rinsed and is left shiny, soft and nonelectric.

EXAMPLE 20

An emulsion having the following composition is prepared:

|  | G. |
|---|---|
| RO$\{C_2H_3O(CH_2OH)\}_nH$ (in which R is an alkyl radical having 16 to 18 carbon atoms and $n$ has a statistical average value of 6) | 8 |
| Paraffin oil | 32 |
| Water | 60 |

This emulsion is of the oil in water type and is especially fine. Without the addition of any other emulsifier it constitutes an excellent cleansing lotion.

EXAMPLE 21

An emulsion having the following composition is prepared:

|  | G. |
|---|---|
| $C_{18}H_{37}O\{C_2H_3O(CH_2OH)\}_nH$ (in which $n$ has a statistical average value of 10) | 8 |
| Glycerol monostearate | 4 |
| Paraffin oil | 28 |
| Water | 60 |

The composition identified in the first line of this list is insoluble when heated in oil. It is brought into solution by the glycerol monostearate, thereby producing a very fine emulsion which makes an excellent cleansing lotion.

EXAMPLE 22

An aqueous solution having the following composition is prepared:

G.

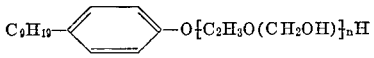

| (in which $n$ has a statistical average value of 6) | 15 |
|---|---|
| Water, q.s.p | 100 |

The pH of the solution is 7.

10 cm.³ of this solution is applied to a head of hair which has first been dampened. The head is then vigorously massaged, and rinsed copiously with water. A second application of 8 to 10 cm.³ of the product follows and produces an abundant foam. The hair is again rinsed, and is then dried, and is left bright, soft and nonelectric.

EXAMPLE 23

An aqueous solution having the following composition is prepared:

G.

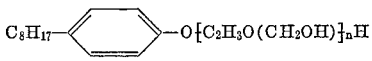

| (in which $n$ has a statistical average value of 6) | 15 |
|---|---|
| Water, q.s.p. | 100 |

The pH of the solution is 7.

10 cm.³ of this solution is applied to a head of hair which has first been dampened. The head is then massaged vigorously and rinsed copiously with water. A second application of 8 to 10 cm.³ of the product follows and produces an abundant foam. The hair is again rinsed, and is then dried and is left shiny, soft and nonelectric.

EXAMPLE 24

An aqueous solution having the following composition is prepared:

G.

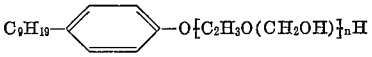

| (in which $n$ has a statistical average value of 6) | 15 |
|---|---|
| Lauric diethanolamide | 2 |
| Carboxymethylcellulose | 0.2 |
| Water, q.s.p. | 100 |

The pH of the solution is 7.5.

10 cm.³ of this solution is applied to a head of hair which has first been dampened. The head in then vigorously massaged and rinsed copiously with water. A second application of 8 to 10 cm.³ of the product follows and produces an abundant foam. The hair is again rinsed, and is then dried, and is left shiny, soft and nonelectric.

EXAMPLE 25

An aqueous solution having the following composition is prepared:

G.

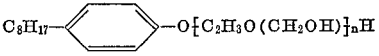

| (in which $n$ has a statistical average value of 6) | 15 |
|---|---|
| Lauric diethanolamide | 2 |
| Carboxymethylcellulose | 0.2 |
| Water, q.s.p. | 100 |

The pH of the solution is 7.5.

10 cm.³ of this solution is applied to a head of hair which has first been dampened. The head is then vigorously massaged and rinsed copiously with water. A second application of 8 to 10 cm.³ of the product follows and produces an abundant foam. The hair is again rinsed, and is then dried, and is left shiny, soft, and nonelectric.

EXAMPLE 26

An aqueous solution having the following composition is prepared:

G.

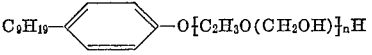

| (in which $n$ has a statistical average value of 6) | 7 |
|---|---|
| Lauric alcohol oxyethylenated with 12 molecules of ethylene oxide | 5 |
| Lauric diethanolamide | 2 |
| Water, q.s.p. | 100 |

The pH of the solution is 6.

10 cm.³ of this solution is applied to a head of hair which has first been dampened. The head is then vigorously massaged and rinsed copiously with water. A second application of 8 to 10 cm.³ of the product follows and produces an abundant foam. The hair is again rinsed, and is then dried, and is left shiny, soft and nonelectric.

EXAMPLE 27

An aqueous solution having the following composition is prepared:

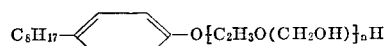

|   | G. |
|---|---|
| (in which $n$ has a statistical average value of 6) | 7 |
| Lauric alcohol oxyethylenated with 12 molecules of ethylene oxide | 5 |
| Lauric diethanolamide | 2 |
| Water, q.s.p. | 100 |

The pH of the solution is 6.

10 cm.³ of this solution is applied to a head of hair which has first been dampened. The head is massaged vigorously to emulsify all the particles of dirt and rinsed copiously with water. A second application of 8 to 10 cm.³ of the product produces an abundant foam which is rinsed away.

Hair washed in this way is left lustrous, soft, and non-electric.

EXAMPLE 28

An aqueous solution having the following composition is prepared:

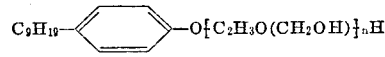

|   | G. |
|---|---|
| (in which $n$ has a statistical average value of 6) | 8 |
| Cetyltrimethylammonium chloride sold under the trademark "Cetavlon" | 3 |
| Water, q.s.p. | 100 |
| Lactic acid, q.s.p., pH 3. | |

10 cm.³ of this solution is applied to a head of hair which has first been dampened. The head is massaged vigorously to emulsify all the particles of dirt and rinsed copiously with water. A second application of 8 to 10 cm.³ of the product produces an abundant foam which is rinsed away.

Hair washed in this way is left lustrous, soft, and non-electric.

EXAMPLE 29

An aqueous solution having the following composition is prepared:

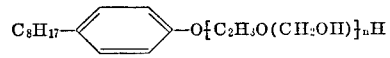

|   | G. |
|---|---|
| (in which $n$ has a statistical average value of 6) | 8 |
| "Cetavlon" | 3 |
| Water, q.s.p. | 100 |
| Lactic acid, q.s.p., pH 3. | |

10 cm.³ of this solution is applied to a head of hair which has first been dampened. The head is massaged vigorously to emulsify all the particles of dirt and rinsed copiously with water. A second application of 8 to 10 cm.³ of the product produces an abundant foam which is rinsed away.

Hair washed in this way is left lustrous, soft, and non-electric.

EXAMPLE 30

An aqueous solution having the following composition is prepared:

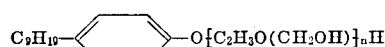

|   | G. |
|---|---|
| (in which $n$ has a statistical average value of 6) | 4 |
| "Cetavlon" | 3 |
| Lauric alcohol oxyethylenated with 12 molecules of ethylene oxide | 4 |
| Water, q.s.p. | 100 |
| Lactic acid, q.s.p., pH 5. | |

10 cm.³ of this solution is applied to a head of hair which has first been dampened. The head is massaged vigorously to emulsify the particles of dirt and rinsed copiously with water. A second application of 8 to 10 cm.³ of the product produces an abundant foam which is rinsed away.

Hair washed in this way is left lustrous, soft, and non-electric.

EXAMPLE 31

An aqueous solution having the following composition is prepared:

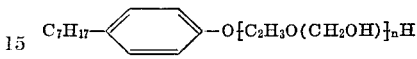

|   | G. |
|---|---|
| (in which $n$ has a statistical average value of 6) | 4 |
| "Cetavlon" | 3 |
| Lauric alcohol oxyethylenated with 12 molecules of ethylene oxide | 4 |
| Water, q.s.p. | 100 |
| Lactic acid, q.s.p., pH 5. | |

10 cm.³ of this solution is applied to a head of hair which has first been dampened. The head is massaged vigorously to emulsify all the particles of dirt and rinsed copiously with water. A second application of 8 to 10 cm.³ of the product produces an abundant foam which is rinsed away.

Hair washed in this way is left lustrous, soft, and non-electric.

EXAMPLE 32

An aqueous solution having the following composition is prepared:

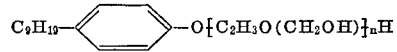

|   | G. |
|---|---|
| (in which $n$ has a statistical average value of 6) | 5 |
| Technical grade ammonium lauryl sulfate (100%) | 5 |
| Lauric diethanolamide | 1 |
| Water, q.s.p. | 100 |

The pH of the solution is 8.

10 cm.³ of this solution is applied to a head of hair which has first been dampened. The head is massaged vigorously to emulsify all the particles of dirt and rinsed copiously with water. A second application of 8 to 10 cm.³ of the product produces an abundant foam which is rinsed away.

Hair washed in this way is left lustrous, soft, and non-electric.

EXAMPLE 33

An aqueous solution having the following composition is prepared:

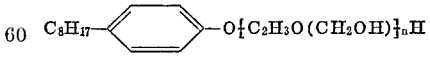

|   | G. |
|---|---|
| (in which $n$ has a statistical average value of 6) | 5 |
| Technical grade ammonium lauryl sulfate (100%) | 5 |
| Lauric diethanolamide | 1 |
| Water, q.s.p. | 100 |

The pH of the solution is 8.

10 cm.³ of this solution is applied to a head of hair which has first been dampened. The head is massaged vigorously to emulsify all the particles of dirt and rinsed copiously with water. A second application of 8 to 10 cm.³ of the product produces an abundant foam which is rinsed away.

Hair washed in this way is left lustrous, soft, and non-electric.

EXAMPLE 34

A solution having the following composition is prepared:

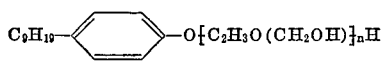

| | G. |
|---|---|
| (in which n has a statistical average value of 6) | 5 |
| Technical grade triethanolamine lauryl sulfate (100%) | 6 |
| Carboxymethylcellulose | 0.3 |
| Water, q.s.p. | 100 |

The pH of the solution is 7.

10 cm.³ of this solution is applied to a head of hair which has first been dampened. The head is massaged vigorously to emulsify all the particles of dirt and rinsed copiously with water. A second application of 8 to 10 cm.³ of the product produces an abundant foam which is rinsed away.

Hair washed in this way is left lustrous, soft, and non-electric.

EXAMPLE 35

A solution having the following composition is prepared:

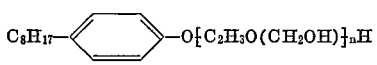

| | G. |
|---|---|
| (in which n has a statistical average value of 6) | 5 |
| Technical grade triethanolamine lauryl sulfate (100%) | 6 |
| Carboxymethylcellulose | 0.3 |
| Water, q.s.p. | 100 |

The pH of the solution is 7.

10 cm.³ of this solution is applied to a head of hair which has first been dampened. The head is massaged vigorously to emulfisy all the particles of dirt and rinsed copiously with water. A second application of 8 to 10 cm.³ of the product produces an abundant foam which is rinsed away.

Hair washed in this way is left lustrous, soft, and non-electric.

EXAMPLE 36

The following composition is prepared:

| | G. |
|---|---|
| RO$\{C_2H_3O(CH_2OH)\}_2H$ in which R is an oleyl radical | 35 |
| RO$\{C_2H_3O(CH_2OH)\}_4H$ in which R is an oleyl radical | 20 |
| 2-butoxy ethanol | 15 |
| 20% ammonia | 13 cm.³ |
| Ethylene diamine tetracetic acid | 0.3 |
| Sodium bisulfite | 0.6 |
| Paratoluylene diamine | 0.4 cm.³ |
| Metadiamino-anisol | 0.04 |
| Resorcine | 0.2 |
| Meta-aminophenol | 0.10 |
| Para-aminophenol | 0.25 |
| Water, q.s.p. | 100 g. |

This solution is mixed with an equal volume of hydrogen peroxide at 20 volumes, thus producing a beautiful transparent gel. The gel is applied to very gray hair for 25 minutes. After shampooing, a chestnut shade results. When dried, the hair is especially soft and lustrous.

EXAMPLE 37

The following composition is prepared:

| | G. |
|---|---|
| RO$\{C_2H_3O(CH_2OH)\}_2H$ in which R is an oleyl radical | 25 |
| RO$\{C_2H_3O(CH_2OH)\}_4H$ in which R is an oleyl radical | 15 |
| Olein | 6 |
| 50% dicetyldimethyl ammonium chloride in isopropanol | 12 |
| 2-butoxy ethanol | 10 |
| Ethyl alcohol | 8 |
| 20% ammonia | 11 cm.³ |
| Paratoluylene diamine | 0.4 |
| Resorcine | 0.15 |
| Meta-aminophenol | 0.1 |
| Para-aminophenol | 0.7 |
| Methyl para-aminophenol | 0.3 |
| Meta-diaminoanisol | 0.02 |
| Ethylene diamine tetracetic acid | 3 |
| Sodium bisulfite | 0.6 |
| Water, q.s.p. | 100 g. |

This solution is mixed with its own volume of hydrogen peroxide at 20 volumes. When applied to very gray hair for 25 to 30 minutes, the result, after shampooing, is a golden chestnut shade.

The hair, after treatment, is very soft and easy to manage.

EXAMPLE 38

Hydrating color base

The following composition is prepared:

| | G. |
|---|---|
| RO$\{C_2H_3O(CH_2OH)\}_{2.5}H$ in which R designates the alkyl radical of the alcohols of the hydrogenated lanolin solid under the trademark "Hydrolan" | 8 |
| Neohexadecyl stearate | 10 |
| Paraffin oil | 8 |
| "Purcellin oil" (product sold by the Dragoco Co.) | 8 |
| Extracts from the lanolin alcohols sold under the trademark "Amerchol L-101" | 0.2 |
| Ferric oxide pigment | 3 |
| Ozokerite | 4 |
| Perfume | 0.2 |
| Water, q.s.p. | 100 |

EXAMPLE 39

Morning cream

The following composition is prepared:

| | G. |
|---|---|
| RO$\{C_2H_3O(CH_2OH)\}_3H$ in which R represents the alkyl radical of the hydrogenated alcohols sold under the trademark "Hydrolan" | 3 |
| Lanolin derivatives sold under the trademark "Super Hartolan" by Croda | 3 |
| Vaseline | 3 |
| Perhydrosqualene | 6 |
| Isopropyl palmitate | 2 |
| Propylene glycol | 8 |
| Water, q.s.p. | 100 |

EXAMPLE 40

Preparation of the product represented by the formula:

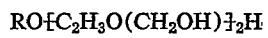

in which R represents a hydrocarbon derived from alcohols obtained from the isostearic acid sold commercially by the Emery Company, the preparation of which is described in U.S. Pat. No. 2,812,342.

The mixture of fatty alcohols obtained by catalytic hydrogenation and distillation has a hydroxyl index of 193.

First step—polycondensation of epichlorohydrin

By reacting 245 g. of isostearylic acid at 80° C. with 148 g. of epichlorohydrin, in the presence of 1.2 ml. of an acetic complex of $BF_3$, a polychlorinated ether is obtained which responds to the formula:

$$RO[C_2H_3O(CH_2Cl)]_2H$$

Second step—hydroxylation 385 g. of the polychlorinated ether obtained in the first step is dissolved in 580 g. of propylene glycol. The mixture is heated to 140° C. and 420 g. of an aqueous 40.4% solution of potassium acetate is introduced by progressively increasing the temperature to 165° C. so as to eliminate the water from the reaction mixture.

After four and a half hours at 180°–190° C., the percentage of substitution, calculated from the acetate consumption, is 99%.

The potassium chloride is then separated and the dipropylene glycol evaporated under vacuum. The deacetylation of the product is then terminated by ethanolysis, using 0.25% sodium methylate as the catalyst.

After evaporation of the ethyl acetate and alcohol, a polyhydroxyl polyether is recovered in the form of a syrupy light yellow liquid.

This product is purified by washing it twice in boiling water, using one liter of water in the first washing and 1.5 liters in the second.

The products represented by the following formula are successively prepared in like manner.

$$RO[C_2H_3O(CH_2OH)]_nH$$

In this formula R represents a hydrocarbon derived from alcohols obtained by the catalytic hydrogenation of commercial isostearic acid. The properties of these derivatives are summarized in the following table:

| $n$ | Appearance | Solubility |
| --- | --- | --- |
| 3 | Very viscous | Insoluble in water. |
|   | Liquid | Soluble in vaseline oil. |
| 6 | Paste | {Dispersible in water. {Soluble in vaseline oil. |
| 9 | Solid brown | Soluble in water. |
|   | Orange | Insoluble in vaseline oil. |

EXAMPLE 41

Hydrating cream of the oil-in-water emulsion type

The following composition is prepared:

|  | G. |
| --- | --- |
| $RO[C_2H_3O(CH_2OR)]_2H$ in which R represents a hydrocarbon derived from alcohols obtained from the isostearic acid solid by the Emery Company, the preparation of which is described in U.S. Pat. No. 2,812,342 | 10 |
| Vaseline oil | 26 |
| Ozokerite | 4 |
| Water, q.s.p. | 100 |

EXAMPLE 42

Beauty cream

The following composition is prepared:

|  | G. |
| --- | --- |
| $RO[C_2H_3O(CH_2OH)]_{9.5}H$ in which R has the significance assigned thereto in Example 41 | 2 |
| Cetyl alcohol | 2 |
| Vaseline | 6 |
| Isopropyl myristate | 5 |
| Glycerine | 10 |
| Water, q.s.p. | 100 |

EXAMPLE 43

Peptization of barium sulfate

Barium sulfate is precipitated by pouring a 2.4 N solution of barium chloride into a 1.6 N solution of sodium sulfate, at the boil, and while stirring. The precipitate is washed by simple decantation. It is very fine and few of its particles have a dimension greater than $4\mu$.

5% of the following product is added to the barium sulfate.

$$R_1O[C_2H_3O(CH_2OH)]_4H$$

In this formula $R_1$ represents a hydrocarbon derived from the alcohols of the hydrogenated lanolin sold under the trademark "Elrolan."

The product is carefully dried and is found to be perfectly wetted by oil so that it may be introduced into emulsions.

The example of barium sulfate is given purely by way of illustration. Pigments such as titanium oxide, iron oxide, and Guimet blue may also be peptized.

EXAMPLE 44

Composition for use as lip rouge

This example illustrates the use of:

$$R_1O[C_2H_3O(CH_2OH)]_4H$$

for peptizing metallic particles. 10 g. of "Bentone 38" (trademark of National Lead Co.) is dispersed in a liquid consisting of 88 g. of paraffin oil and 2 g. of the above product and excellent homogenization is produced by vigorous stirring. The dispersion thus obtained is dispersed in the remaining components of a lip rouge, and 1 to 15% of flakes of aluminium paint are introduced into the mixture, which is kept more or less liquid.

The scope of the invention is not limited to the foregoing examples, and the examples could be modified as to detail without departing from the basic principles of the invention. In particular the hydrophilic property of the compounds of the invention could be increased by subsequent reaction with one or more molecules of ethylene oxide. Moreover, the compounds according to the invention may be transformed by a known process, into ionic surface-active agents by introducing ionic groups into the compound structure such as sulfonate ions, carboxylate ions, phosphate ions, etc.

Although the examples set forth above use R groups obtained by reacting commercially available fatty alcohol mixtures similar results are obtained by using a single fatty alcohol, aliphatic alcohol or alicylic alcohol. When a single or pure ROH reactant is used the R portion of the compounds formed all have that R group.

The following alcohols further illustrate the type alcohols that could be substituted in the above examples to produce the compounds of this invention which have the corresponding R groups present in the specific alcohol reactant:

(a) Saturated linear alcohols such as:
    1-octanol
    1-decanol
    1-undecanol
    1-dodecanol
    1-tridecanol
    1-tetradecanol
    1-pentadecanol
    1-hexadecanol
    1-heptadecanol
    1-octadecanol
    1-eicosanol
    1-docosanol (b) Unsaturated linear alcohols such as:
    oleyl alcohols (cis-9-octadecene-1-ol)
    elaidyl alcohol (trans-9-octadecene-1-ol)
    erucylic alcohol (cis-13-docosene-1-ol)

(c) Branched chain alcohols such as:
    2-ethyl-1-hexanol
    2-methyl-1-decanol
    2-methyl-1-dodecarol
    2-methyl-1-tridecanol
    2-methyl-1-tetradecanol
    3,7,11,15-tetramethyl-1-hexadecanol
    2,3,5,7-tetramethyl-1-nonanol
    2,4,7-trimethyl-1-nonanol 2-octyl-1-dodecanol
2-hexyl-1-decanol
2-methyl-alkanols
(d) Fatty alcohols derived from animal and vegetable oils and fats, such as:
copra
tallow, etc.
(e) Mixed industrial alcohols such as those derived from the "Alfol" process, the "Oxo" process, etc. These compositions contain a variety of isomers and homologs which vary with the olefin feed that is being converted to the alcohol mixture.
(f) Fatty alcohols prepared using the Guerbet reaction.
(g) Fatty alcohols prepared using the method described in U.S. Pat. 2,812,342.
(h) Phenol alkyls, such as:
 -p-tert-octyl-phenol
 -p-sec-octyl-phenol
 -p-isononyl-phenol
 -p-tert-dodecyl-phenol
 -p-isododecyl-phenol
in general manner these alcohols are obtained by alkylation of phenols with olefins such as dodecine, tripropylene, tetrapropylene and diisobutylene.
(i) Aliphatic alcohols, such as:
 -ceryl alcohol
 -melissyl alcohol
 -cholesterol
 -lanesterol or dihydrolanesterol
 -mixtures obtained by catalytic hydrogenation of lanolin or resinic fatty acids.

The preparation of lanolin alcohols by hydrogenation was described by K. Stickdorn, E. Konig and Birk in the Tenside Review, 3, No. 2 (1966), p. 45.

(j) Saturated cyclic fatty alcohols, such as:

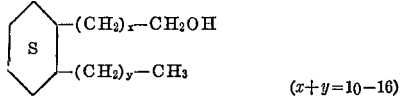

These cyclic alcohols have been described by Bell-Friedrich Gast and Cowan in JAOCS Review, 42, October 1965, on p. 876.

(k) The following hair dyes illustrate the type of dyes which can be used in a hair dye composition with the compound of the Formula I:
 paratoluylene diamine
 metadiamino anisol
 resorcine
 m-aminophenol
 p-aminophenol
 methyl p-aminophenol (l) The following shampo ingredients illustrate the type of ingredients which can be used in a shampoo composition with the compound of Formula I
 cetyl-trimethyl-ammonium bromide
 diethanolamide of copra
 polyethylene glycol
 lauryl sulfate
 sodium salt of ethoxyl alkyl sulfate
 lauric diethanolamid
 oxyethylenated lauric alcohol
 carboxymethylcellulose
 lactic acid (m) The following cosmetic ingredients illustrate the type of ingredients which can be used in a cosmetic composition with the compound of Formula I
 paraffin oil
 glycerol monostearate
 neohexadecyl stearate
 Vaseline
 perhydrosqualène
 isopropyl palmitate
 propylene glycol

What is claimed is:
1. Compounds having the formula:

$$RO-\left[CH_2CH-O\right]_n-H$$
$$\hphantom{RO-[}CH_2OH$$

wherein R is a lipophile group selected from the class consisting of linear or branched alkyl or alkenyl which have 8 to 30 carbon atoms, and alkyl aryl, alkyl alicyclic and alkenyl alicyclic which have 8 to 30 carbon atoms and $n$ is 2–10.

2. The compound of claim 1, in which R is said alkyl.
3. The compound of claim 1, in which R is said alkenyl.
4. The compound of claim 1, in which R is said alkyl aryl.
5. The compound of claim 1, in which R is said alkyl alicyclic.
6. A method for preparing compounds having the formula $$RO-\left[CH_2CH-O\right]_n-H$$
$$\hphantom{RO-[}CH_2OH$$

wherein R is a lipophile group selected from the class consisting of linear or branched alkyl or alkenyl which have 8 to 30 carbon atoms, and alkyl aryl, alkyl alicyclic and alkenyl alicyclic which have 8 to 30 carbon atoms and $n$ is 2–10 comprising polycondensing $n$ molecules of glycerol epihalohydrin on each molecule of a compound having the formula ROH wherein R has the meaning given above at a temperature between 25–160° C. in the presence of an acid catalyst and hydroxylating the resulting halogen-containing condensate with a carboxylic acid salt at a temperature between 150–200° C. in the presence of at least 50% by weight of said halogen-containing condensate of a solvent selected from the group consisting of propylene glycol, dipropylene glycol, hexylene glycol, diethylene glycol, the ethers of diethylene glycol, ethylene glycol and 2-butoxy-ethanol.

7. The method claimed in claim 6 in which the carboxylic acid salt is used to effect the hydroxylation is an alkaline acetate.

8. The method claimed in claim 7 in which the alkaline acetate is introduced in a proportion no more than 10 to 15% greater than its stoichiometric proportion to the substances with which it reacts.

9. The method of claim 6, in which said polycondensation acid catalyst is selected from the group consisting of boron trifluoride, stannic chloride and antimony pentachloride.

References Cited

UNITED STATES PATENTS

| | | | |
|---|---|---|---|
| 1,402,317 | 1/1922 | Rodebush | 260—636 |
| 2,089,569 | 8/1937 | Orthner et al. | 260—615(B)UX |
| 2,096,036 | 10/1937 | Hansley | 260—638 |
| 2,131,142 | 9/1938 | Orthner et al. | 260—613(B)UX |
| 2,260,753 | 10/1941 | Marple et al. | 260—612 |
| 2,986,570 | 5/1961 | Monroe et al. | 260—615(B)X |
| 3,190,926 | 6/1965 | Edwards | 260—613(B) |

FOREIGN PATENTS

| | | | |
|---|---|---|---|
| 1,022,878 | 3/1966 | Great Britain | 260—613(B) |

OTHER REFERENCES

Groggins: Unit Processes in Organic Synthesis (1952), pp. 616–620.

BERNARD HELFIN, Primary Examiner

U.S. Cl. X.R.

260—613, 615; 252—89, 351; 424—63, 70